N. Mendenhall,
Corn Planter.
No. 109,923.  Patented Dec. 6, 1870.

N. Mendenhall
INVENTOR.
By Knight Bros.
Atty's

Attest.
Jas. H. Layman

United States Patent Office.

NOAH MENDENHALL, OF GREENSBURG, INDIANA.

Letters Patent No. 109,923, dated December 6, 1870.

IMPROVEMENT IN CORN-PLANTERS.

The Schedule referred to in these Letters Patent and making part of the same.

I, NOAH MENDENHALL, of Greensburg, Decatur county, Indiana, have invented a new and useful Corn-Planter, of which the following is a specification.

Nature and Objects of the Invention.

This is an improvement in the class of corn-planters having in rear of the furrowing-share a seed-distributer, whose slide is operated from a trigger beneath or upon one of the handles of the machine, and my invention relates chiefly to an arrangement of parts for the certain and uniform delivery of the seed in the exact spots desired, and in full view of the operator.

General Description with Reference to the Drawing.

Figure 1:
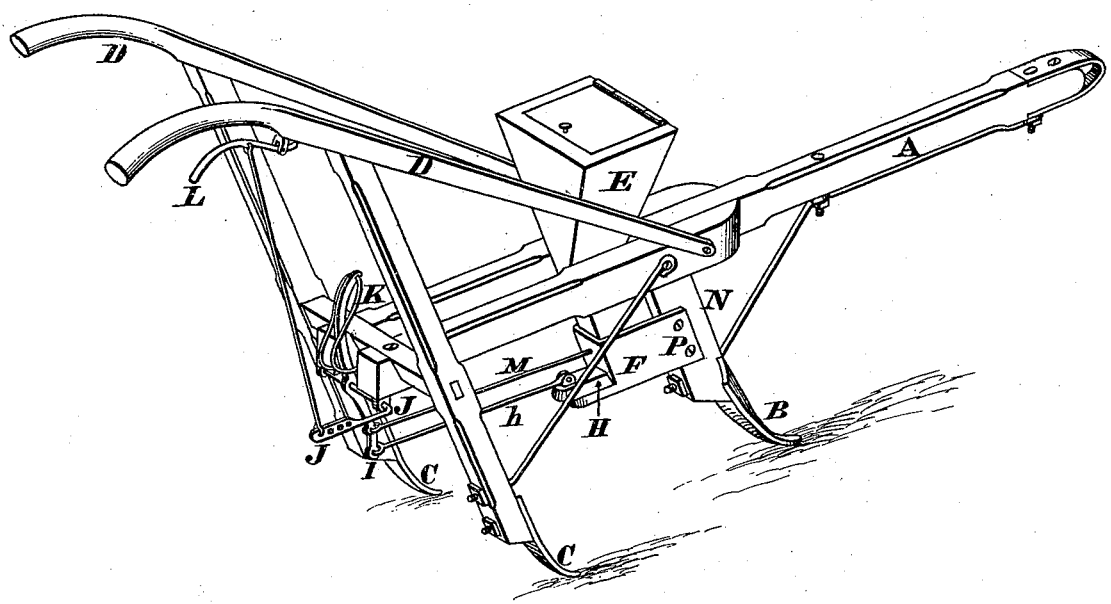
Figure 1 is a perspective view of an implement embodying my improvement.
Figure 2:
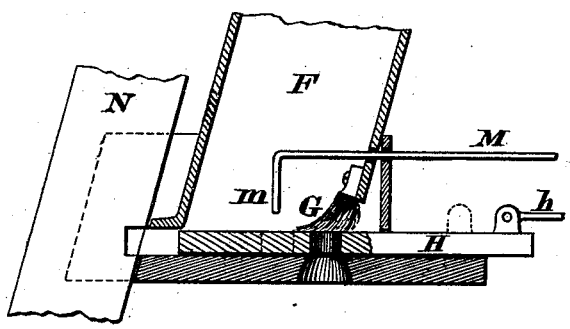
Figure 2 is a longitudinal section.
Figure 3:
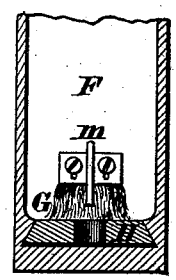
Figure 3 is a transverse section of the seed-distributer.

The beam A, furrowing-share B, covering-shares C, and handles D, may be of usual construction.

The rear portion of the beam is forked, as shown, to receive the lower portion of the hopper E, which hopper discharges into the grain-box F, having a customary brush cut-off G, and perforated slide or shuttle H, whose beveled upper sides play in corresponding guides in the box sides.

The slide is connected by rod $h$, with a lever, I, upon rock-shaft J, which lever being pressed by a spring, K, holds the slide to its extreme forward position except when drawn back by the trigger L.

A rod, M, having a hooked extremity, $m$, which enters the box through a hole in its rear, and whose rear end is pivoted to the lever, operates to agitate the grain at every motion of the trigger, and thus effectually prevents it lodging or bunching in its passage to the distributer.

The box F is attached to the standard N by suitable screws P, and is easily detached for adjustment or renewal of the cut-off, or other purpose.

The slide being removed, may be replaced by one having a larger or smaller hole to suit the size of corn or the number of grain which it is desired to drop to a hill.

The same machine may thus be adapted for any size of Indian corn, as well as for sorghums or other grain or seed.

Claim.

I claim as new and of my invention—

The combination of the box F, cut-off G, slide H, rod $h$, lever I, rock-shaft J, spring K, agitator M attached to lever I, and trigger L, all arranged, constructed, and operated in the manner and for the purpose set forth.

In testimony of which invention I hereunto set my hand.

NOAH MENDENHALL.

Witnesses:
GEO. H. KNIGHT,
JAMES H. LAYMAN.